(12) United States Patent  (10) Patent No.: US 7,959,107 B2
Beaufort (45) Date of Patent: Jun. 14, 2011

(54) HINGE DEVICE OF A NACELLE COWLING OF AN AIRCRAFT ENGINE ON A SUPPORTING STRUCTURE

(75) Inventor: Jacques Beaufort, Blagnae (FR)

(73) Assignee: Airbus France, Toulouse (FR)

( * ) Notice: Subject to any disclaimer, the term of this patent is extended or adjusted under 35 U.S.C. 154(b) by 949 days.

(21) Appl. No.: 11/765,065

(22) Filed: Jun. 19, 2007

(65) Prior Publication Data

US 2008/0023584 A1 Jan. 31, 2008

(30) Foreign Application Priority Data

Jun. 29, 2006 (FR) ...................................... 06 52715

(51) Int. Cl.
*B64C 1/14* (2006.01)
(52) U.S. Cl. ...................................... 244/129.4; 244/54
(58) Field of Classification Search .................... 244/54, 244/129.4, 131, 129.5; 16/233; 415/213.1, 415/126; 248/554–557
See application file for complete search history.

(56) References Cited

U.S. PATENT DOCUMENTS

| 4,585,189 A | * | 4/1986 | Buxton ........................... 244/54 |
| 5,203,525 A | | 4/1993 | Remlaoui |
| 5,275,357 A | * | 1/1994 | Seelen et al. ..................... 244/54 |
| 6,401,299 B1 | * | 6/2002 | Schwarz ......................... 16/335 |
| 7,147,185 B2 | | 12/2006 | Beaufort |

FOREIGN PATENT DOCUMENTS

| EP | 1 245 769 A2 | 10/2002 |
| FR | 2 715 185 | 7/1995 |

* cited by examiner

*Primary Examiner* — Joshua J Michener
*Assistant Examiner* — Brian O'hara
(74) *Attorney, Agent, or Firm* — Oblon, Spivak, McClelland, Maier & Neustadt, L.L.P.

(57) ABSTRACT

A hinge device of a nacelle cowling of an aircraft engine on a supporting structure is disclosed. The hinge device includes two fittings and a link rod connected thereto and mounted on the fitting by an end connection. The link rod is further mounted on the fitting by an intermediate connection including a pivot pin slidably housed in a hole, and the end connection includes a guide pin slidably housed in a guide ramp. The connections are designed so as to create, upon rotation of the link rod about the pin, a relative movement of the axis in the ramp, simultaneously causing a relative movement of the pin in the hole.

15 Claims, 5 Drawing Sheets

HINGE DEVICE OF A NACELLE COWLING OF AN AIRCRAFT ENGINE ON A SUPPORTING STRUCTURE

TECHNICAL FIELD

This invention relates in general to a hinge device of a nacelle cowling of an aircraft engine on a supporting structure, such as a mounting device, also called an engine mounting structure or EMS, normally used to suspend an engine below the wings of the aircraft, to mount said engine above these same wings, or to attach said engine to the rear portion of the aircraft fuselage.

The invention can be used on any type of aircraft equipped with turbojets or turboprop engines.

PRIOR ART

Typically, to mount a nacelle cowling on a rigid/primary structure of an engine mounting structure, a hinge system is used, which includes a plurality of hinge devices, for example three, among which there are two conventional hinge devices and a third so-called "semi-floating" hinge device providing a degree of freedom of movement in the vertical plane. More specifically, the conventional hinge devices include two fittings respectively secured to the cowling and the rigid engine mounting structure, connected to one another by a swivel assembly pin passing through them and centred on the hinge axis of the nacelle cowling, while the third "semi-floating" hinge device includes a link rod swivel-mounted at its two ends on the two aforementioned fittings.

Such an arrangement in fact offers a convenient alignment according to the hinge axis of one of the two swivel-mounted assembly pins at one of the ends of the link rod, with the swivel assembly pins belonging to the two other hinge devices of the system, which allows for easy assembly of the nacelle cowling on the rigid engine mounting structure.

Conventionally, the nacelle cowlings are locked to the engine, and the latter is connected to the rigid engine mounting structure by means of lateral thrust take-up rods. Thus, during the flight, it is possible to observe relative movements between the rigid engine mounting structure and the nacelle cowlings, for example on the order of 2 cm, primarily due to the thermal dilation of the thrust take-up rods located in the vicinity of the combustion chamber of the engine. It is noted that these relative movements occur substantially in the longitudinal direction of the engine, i.e. also substantially in the direction of the hinge axis of the nacelle cowling concerned.

When such relative movements occur, they involve, for both conventional devices, the sliding according to the hinge axis, which has no major disadvantage.

However, for the third "semi-floating" hinge device, the aforementioned relative movement between the rigid engine mounting structure serving as a support for this device and the cowling concerned causes a rotation of the link rod according to an axis substantially orthogonal to the longitudinal direction of this link rod, i.e. substantially in the vertical direction.

The observed rotation necessarily reduces the distance between the rigid engine mounting structure and the cowling, at the level of this third hinge device. The disadvantage of this lies in the appearance of significant local mechanical stresses between the two elements supporting this same third "semi-floating" hinge device.

OBJECT OF THE INVENTION

The invention is therefore generally intended to propose a hinge device of a nacelle cowling of an aircraft engine on a supporting structure, overcoming the disadvantages mentioned above, relating to the embodiments of the prior art.

To do this, the invention relates to a hinge device of a nacelle cowling of an aircraft engine on a supporting structure, which device includes a first fitting intended to be securely mounted on one of the two elements chosen from the cowling and the supporting structure as well as a second fitting intended to be securely mounted to the other of these two elements, and also comprising a link rod connected to the first and second fittings and extending in a longitudinal link rod direction, wherein said link rod includes a first end mounted on the first fitting by means of a first end connection integrating an assembly pin intended to be centred on a hinge axis of the nacelle cowling, as well as a second end mounted on the second fitting by means of a second end connection. According to the invention, the link rod is also mounted on the second fitting by means of an intermediate connection including a pivot pin slidably housed in a hole, with the latter being formed on one of the two elements chosen from the second fitting and the link rod, and the pivot pin being borne by the other of these two elements, and the second end connection includes a guide pin slidably housed in a guide ramp, wherein the second end connection and the intermediate connection are designed so as to cause, on rotation of the link rod about the pivot pin, a relative movement of the guide pin in the guide ramp, simultaneously causing a relative movement of the pivot pin into the hole of the intermediate connection.

Thus, the principle of the invention is based, among other things, on the placement of two connections between the link rod and the second fitting, which make it possible, owing to their simultaneous actions, to cause an additional relative movement of said link rod with respect to the second fitting, upon rotation of said link rod capable of occurring upon the creation of a relative movement between the cowling and the supporting structure, such as the engine mounting structure, as discussed above. By way of indication, the additional relative movement of the link rod with respect to the second fitting can be of the translation type in the link rod direction, when the hinge device is seen according to the direction of the pivot pin.

Consequently, during flight, when relative movements appear between the rigid engine mounting structure and a given nacelle cowling resulting primarily from the thermal dilation of the thrust take-up rods and occurring substantially according to the hinge axis of this same cowling, the link rod of the device then undergoes a movement with respect to the second fitting, which can be broken down into a rotation according to the pivot pin, and an additional relative movement such as a translation according to the longitudinal link rod direction, as mentioned above. This additional relative movement advantageously makes it possible to strongly limit and even completely prevent the approach of the cowling of the supporting structure at the location of said hinge device, since it allows the positioning of the first link rod end to be maintained on or in the vicinity of the hinge axis on which it is initially centred in non-biased mode, i.e. on the ground and cool.

In this context, the second end connection and intermediate connection are designed so as to cause the movement of the first link rod end, upon rotation of the link rod about the pivot pin, along an axis of movement, therefore preferably corresponding to the aforementioned hinge axis.

It should thus be understood that the second end connection and the intermediate connection are designed so as to make it possible to maintain, upon rotation of the link rod about the pivot pin, the centring of the assembly pin on the hinge axis of the nacelle cowling. In other words, the first link rod end remains positioned on the hinge axis along which it moves during the rotation of the link rod, so that during such a rotation, the assembly pin can also move along this hinge axis on which it can therefore remain centred. Naturally, maintaining the centring of the assembly pin on the hinge axis of the nacelle cowling during the rotation of the link rod about the pivot pin is in particular obtained by providing a specific shape for the guide ramp at the origin of the aforementioned additional relative movement, which a person skilled in the art can then easily determine according to the other technical characteristics of the hinge device. By way of indication, it can, for example, be a guide ramp defining a convex path oriented inwardly toward the pivot pin.

The hole is preferably formed in the link rod, and the pivot pin is borne by the second fitting, although the reverse configuration is possible without going beyond the scope of the invention. In this preferred case, the hole can extend parallel to the longitudinal link rod direction, and the pivot pin can be orthogonal to this longitudinal link rod direction and to the hinge axis of the nacelle cowling. Of course, providing the hole parallel to the longitudinal link rod direction makes it possible to obtain the additional relative movement of the link rod with respect to the second fitting in the form of a translation in this same link rod direction, when the hinge device is seen according to the direction of the pivot pin.

Still preferably, the guide ramp is formed in the second fitting, and the guide pin is borne by the link rod, although the reverse configuration is possible without going beyond the scope of the invention. In this preferred case, the guide pin is borne by the link rod with the assistance of a swivel, which makes it possible in particular for the hinge device to have a so-called "semi-floating" character, i.e. providing a degree of freedom of movement in the vertical plane, facilitating the alignment of the assembly pin in the hinge axis of the nacelle cowling concerned.

Again, the guide pin is orthogonal to the longitudinal link rod direction and to the hinge axis of the nacelle cowling, therefore making it substantially parallel to the pivot pin.

The guide ramp is preferably a double ramp cooperating with the two ends of the guide pin.

Finally, the assembly pin is borne by the first end of the link rod, with the assistance of a swivel.

The invention also relates to a hinge system of a nacelle cowling of an aircraft engine on a supporting structure, which system includes at least one hinge device as described above, preferably in combination with other conventional mounting devices such as those described previously in the prior art.

Moreover, the invention also relates to an engine assembly for an aircraft, including an engine as well as a nacelle comprising a plurality of nacelle cowlings, wherein at least one of these cowlings is equipped with a hinge device such as that described above. Thus, a plurality of these nacelle cowlings are preferably equipped with such a hinge device, namely the two reverse thrust cowlings, and optionally two fan cowlings.

The engine assembly preferably also comprises a rigid engine mounting structure forming said supporting structure for at least one hinge device as described above.

Finally, the invention also relates to an aircraft comprising at least one engine assembly as indicated above, assembled on a wing or on a rear portion of the fuselage of said aircraft.

Other advantages and features of the invention will appear in the following detailed non-limiting description.

BRIEF DESCRIPTION OF THE DRAWINGS

This description is provided in reference to the appended drawings, in which.

DETAILED DESCRIPTION OF PREFERRED EMBODIMENTS

Figure 1:
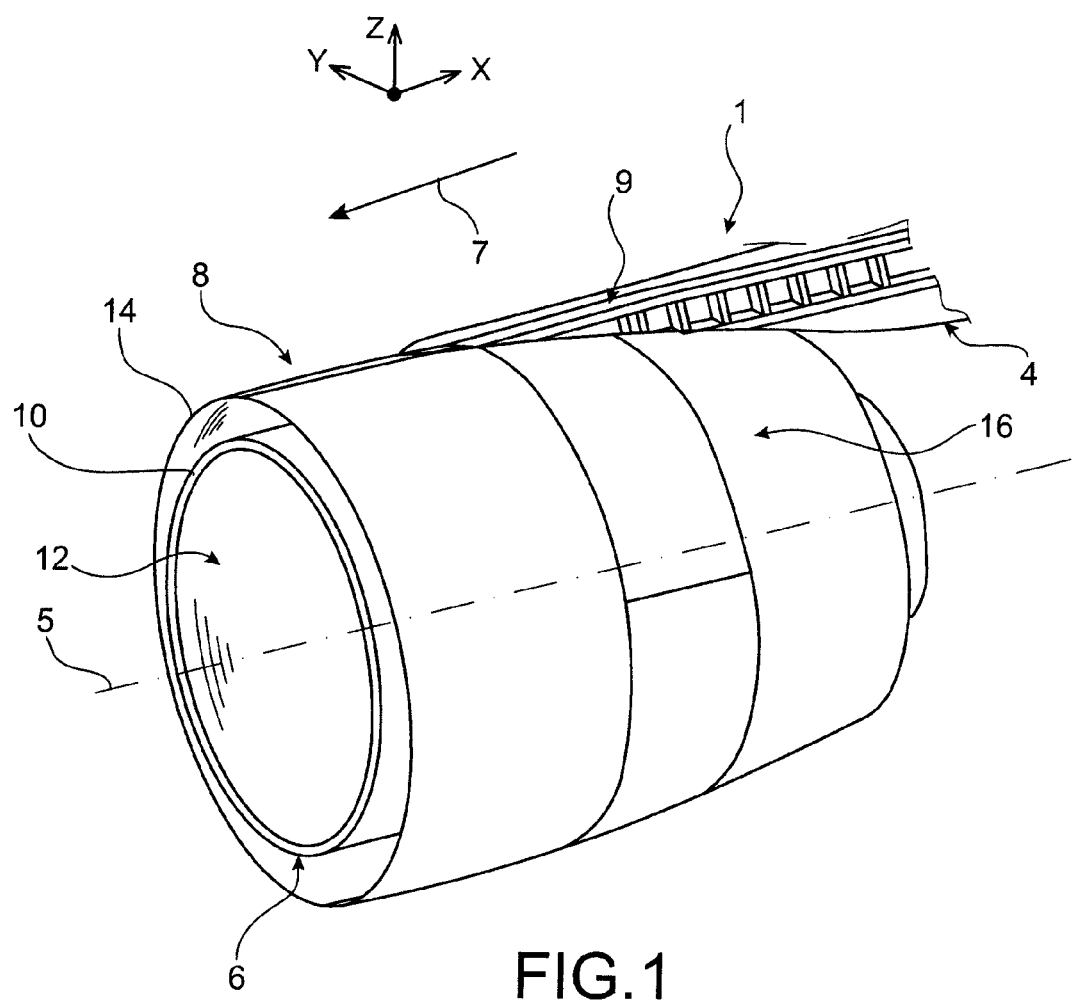
FIG. 1 shows a perspective view of an engine assembly for an aircraft according to this invention.

FIG. 1 shows an engine assembly 1 for an aircraft according to this invention, intended to be attached under a wing (not shown) of said aircraft, which assembly 1 comprises a mounting device or an engine mounting structure 4, an engine 6 such as a turbojet mounted under said device 4, as well as a nacelle 8 arranged around the engine.

Generally, the mounting device 4 comprises a rigid structure 9 with mounting means (not shown) for mounting the engine 6, as well as another series of fasteners (not shown) for suspending said assembly 1 under the wings of the aircraft.

Throughout the following description, by convention, X will refer to the longitudinal direction of the assembly 1, which is also comparable to the longitudinal direction of the turbojet 6 and to that of the mounting device 4, with this direction X being parallel to a longitudinal axis 5 of said turbojet 6. In addition, Y will refer to the transverse direction with respect to the engine assembly 1 and also comparable to the transverse direction of the turbojet 6 and to that of the device 4, and Z will refer to the vertical direction or the height, with said three directions X, Y and Z being orthogonal with respect to one another.

In addition, the terms "front" and "rear" are to be considered with respect to a forward direction of the aircraft resulting from the thrust exerted by the turbojet 6, with this direction being shown diagrammatically with the arrow 7.

FIG. 1 shows a portion of the rigid structure 9 of the mounting device 4, which structure 9 is in the form of a wing section extending from the rear to the front, substantially in direction X. The other constituent parts (not shown) of this device 4, such as the secondary structure ensuring the segregation and maintenance of the systems while supporting aerodynamic fairings, are conventional elements that are identical or similar to those found in the prior art, and known to a person skilled in the art. Consequently, a detailed description of them will be not provided.

In addition, the turbojet 6 has, at the front, a large fan case 10 defining an annular fan frame 12, and comprises, toward the rear, a smaller central case (not visible), containing the core of said turbojet.

As seen in FIG. 1, the nacelle 8, conventionally and as known to a person skilled in the art, includes nacelle cowlings, and more specifically fan cowlings 14 extended toward the rear by reverse thrust cowlings 16. There are two fan cowlings 14, as for the reverse thrust cowlings, pivotably connected to the mounting device 4 and arranged so as to be substantially symmetrical with respect to the vertical plane passing through the axis 5 of the engine 6. Each of the nacelle cowlings 14, 16 therefore has a C-shape pivotably connected at the level of its upper end to the engine mounting structure 4, and attached to the engine 6 by its lower end using conventional locking systems.

By way of indication, it is specified that an air inlet (not shown) is also an integral part of the nacelle.

Figure 2:
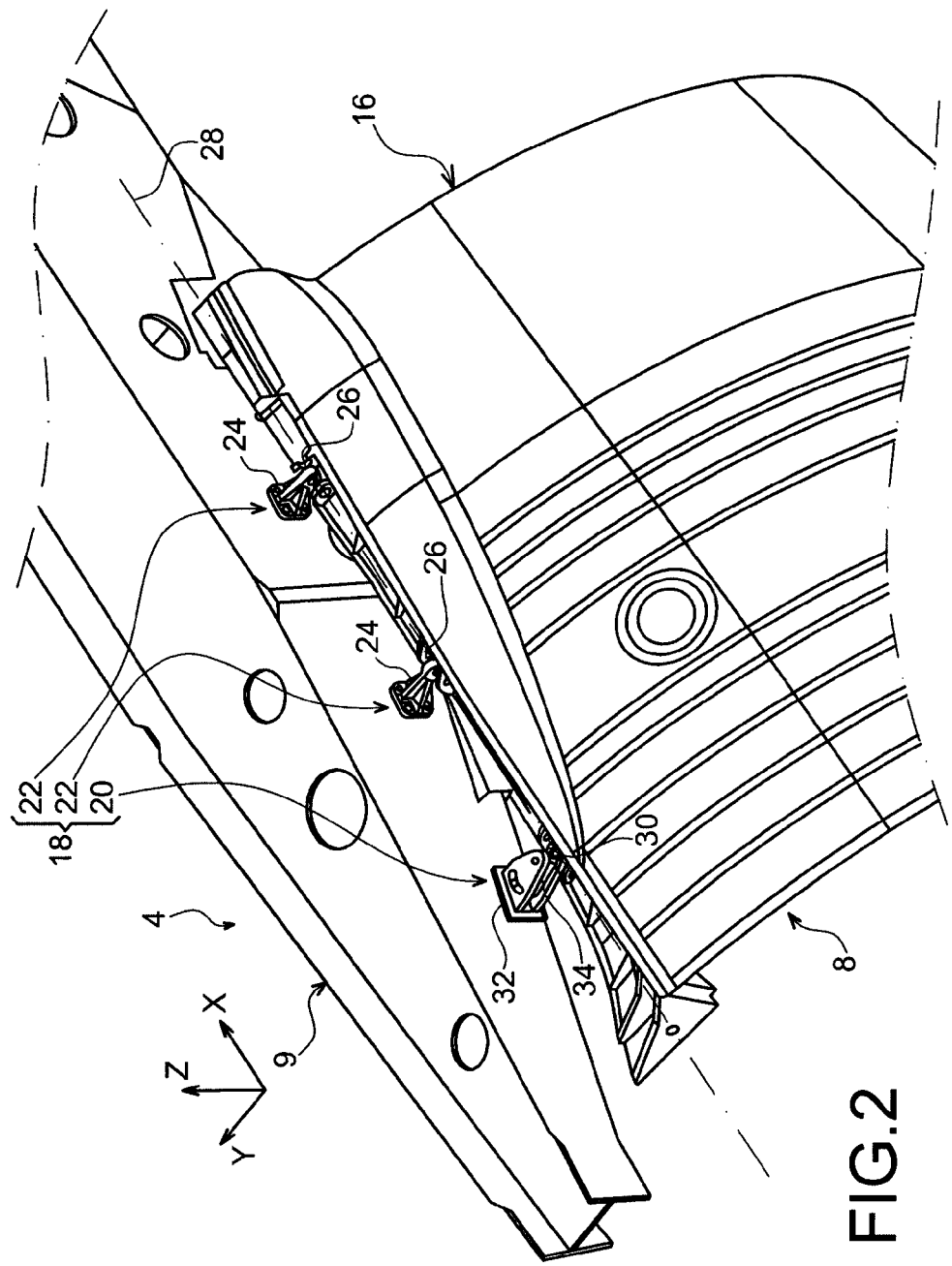
FIG. 2 shows an enlarged perspective view of a portion of the engine assembly shown in FIG. 1, showing more specifically the hinge system of a reverse thrust cowling.

FIG. 2 shows a hinge system 18 of a nacelle cowling according to a preferred embodiment of this invention, which system (not shown in FIG. 1) enables the left reverse thrust cowling 16 to be pivotably connected to the engine mounting structure 4. Of course, such a system 18, which will be described below, is preferably identical or similar to that used for the pivotable connection of the right reverse thrust cowling, and optionally for the pivotable connection of the fan cowlings of the nacelle.

In general, the hinge system 18 includes three hinge devices spaced apart from one another in direction X, and includes two conventional hinge devices 22 as well as a hinge device 20 specific to this invention, preferably placed in front with respect to the other two. Naturally, the number of hinge devices 20, 22 can be adjusted as needed, without going beyond the scope of this invention.

Briefly, each conventional hinge device 22 includes, for example, two fittings 24, 26 respectively secured to the rigid structure 9 of the engine mounting structure 4 and the cowling 16, which fittings are connected to one another by a swivel assembly pin (not shown) passing through them. In addition, each swivel assembly pin is centred on a hinge axis of the nacelle cowling referenced 28, around which the latter is intended to pivot when it is opened/closed. Preferably, the hinge axis 28 is located parallel to direction X.

Figure 3:
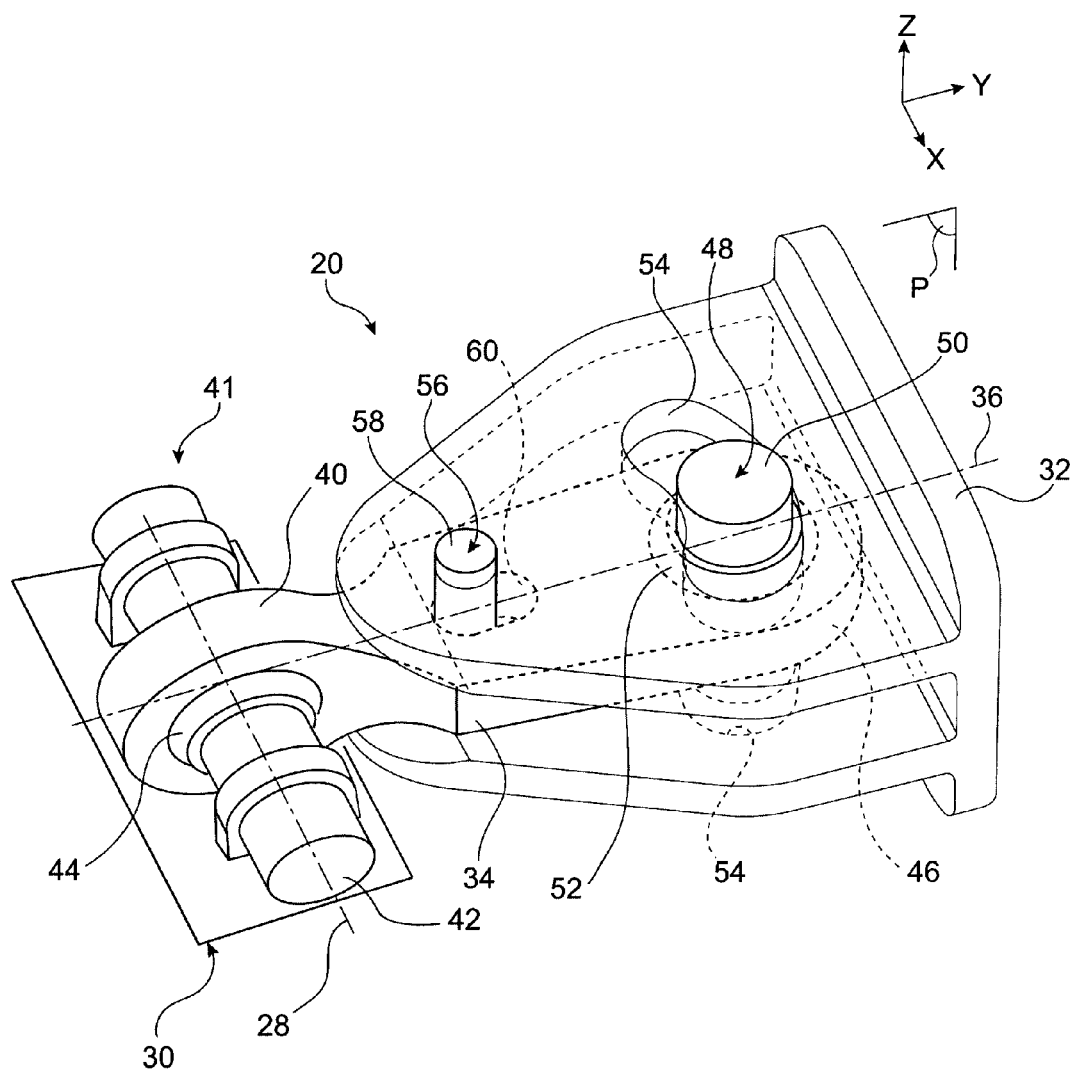
FIG. 3 shows a perspective view of a hinge device of a nacelle cowling belonging to the system shown in FIG. 2, wherein the hinge device is in the form of a preferred embodiment of this invention and is shown in a non-biased mode.
Figure 4:
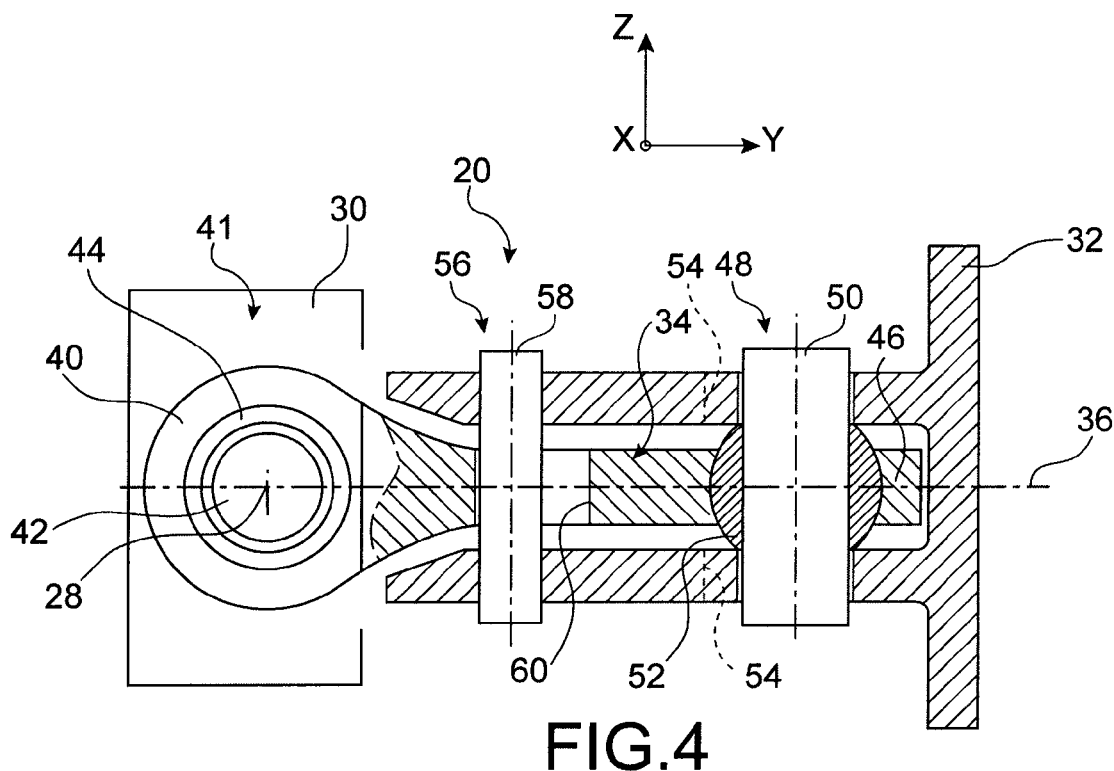
FIG. 4 shows a cross-section view along plane P of FIG. 3, corresponding to a vertical plane symmetrically passing through the hinge device.

The hinge device 20, also called a "semi-floating" device, i.e. providing a degree of freedom of movement in the vertical plane, facilitating the alignment of the assembly pin of this device in the hinge axis 28, primarily includes a first fitting 30 secured to the cowling 16, a second fitting 32 secured to the rigid structure 9, and a link rod 34 connecting the two fittings and bearing the mounting pin at one of its ends. The hinge device 20 will now be described in detail in reference to FIGS. 3 and 4.

These figures show that the fittings 30, 32 are double-headed pierced fittings forming a clevis, wherein the heads of the first fitting 30 are located substantially in the YZ planes, while the heads of the second fitting 32 are located substantially in the XY planes.

In this non-biased mode in which the device 20 is shown, comparable to a normal mode when on the ground and cool, with the link rod 34 extending in the link rod direction 36 is located substantially parallel to direction Y. Nevertheless, even if this orientation in direction Y is desired, it is possible for the link rod 34 to be offset from this orientation so that the assembly pin that it bears (described below) is centred on the hinge axis 28 defined by the two other hinge devices 22. In such a case, which also show "semi-floating" character of the device 20, the link rod 34 can then be slightly tilted with respect to direction Y, in a YZ plane.

The link rod 34 has a first end 40 mounted on the first fitting 30 by means of a first end connection 41, which end 40 is housed between the two heads of the fitting 30. The first connection 41 comprises the aforementioned assembly pin referenced 42, which pin 42 is centred on the hinge axis 28, and passes through the two heads of the fitting 30 as well as the end 40 of the link rod 34 of which the aperture is equipped with a swivel 44 bearing this same assembly pin 42.

In addition, the link rod 34 includes a second end 46 opposite the first, cooperating with the second fitting 32 on which it is mounted by means of a second end connection 48. This connection 48 includes a guide pin 50 oriented substantially in direction Z, and more specifically orthogonally to the hinge axis 28 and to the link rod direction 36 extending in direction Y. The guide pin 50 passes through the two heads of the second fitting 32 as well as the second end 46 of the link rod 34 of which the aperture is equipped with a swivel 52 bearing this same pin 50.

In addition, the guide pin is slidably housed in a guide ramp 54 formed in the fitting 32, which ramp 54 defines a convex path oriented inwardly toward the pivot pin. By way of indication, the aforementioned path along which the pin 50 is capable of moving can, for example, have the form of an arc of circle, as shown in the figures.

In the embodiment described, the ramp is a double ramp insofar as it can be broken down into two identical ramps 54, each cooperating with one of the two ends of the guide pin. Thus, each ramp 54 is formed on one of the two heads of the fitting 32, and is therefore arranged in an XY plane orthogonal to the direction of the guide pin 50. The two identical ramps 54 having the form of holes are therefore superimposed in direction Z, in which direction their extensions merge.

The link rod 34 is also mounted on the second fitting 32 by means of an intermediate connection 56, located between the two end connections 41, 48. The intermediate connection 56 includes a pivot pin 58 securely borne by the fitting 32, which pin 58 is oriented substantially in direction Z, and more specifically orthogonally to the hinge axis 28 and to the link rod direction 36 extending in direction Y. The pivot pin 58 therefore passes through the two heads of the second fitting 32 to which it is secured, as well as a hole 60 formed in the link rod 34 in which this same pin 56 is slidably housed. As shown in the figures, the hole 60 is preferably formed parallel to the link rod direction 36.

One of the specific features of this invention lies in the design and shape of the second end connection 48 and the intermediate connection 56 determined so as to cause, upon rotation of the link rod 34 about the pivot pin 58, a movement of the guide pin 50 in the guide ramp, which itself simultaneously causes a relative movement of the pivot pin 58 into the hole 60. In other words, we seek to obtain an additional relative movement of the link rod 34 with respect to the second fitting 32, upon rotation of said link rod capable of occurring as a result of the creation of a relative movement between the cowling and the engine mounting structure, as discussed above. In this regard, as described below in reference to FIG. 5, the additional relative movement of the link rod 34 with respect to the second fitting 32 can be of the translation type in the link rod direction 36, when the hinge device is seen according to the direction of the pivot pin.

Consequently, during flight, when relative movements appear between the engine mounting structure 4 and the cowling 16 resulting primarily from the thermal dilation of the thrust take-up rods and occurring substantially according to the hinge axis 28 of this same cowling, the link rod 34 then moves with respect to the second fitting 32, which can be broken down into a rotation about the pivot pin 58, and an additional relative movement such as a translation in the longitudinal link rod direction 36, as mentioned above.

In the preferred embodiment described, the additional relative movement caused is used to prevent the approach of the two fittings 30, 32 at the location of said hinge device 20, upon the rotation of the link rod 34 resulting from the relative movement between the engine mounting structure 4 and the cowling 16 according to the hinge axis 28 or in direction X.

Figure 5:
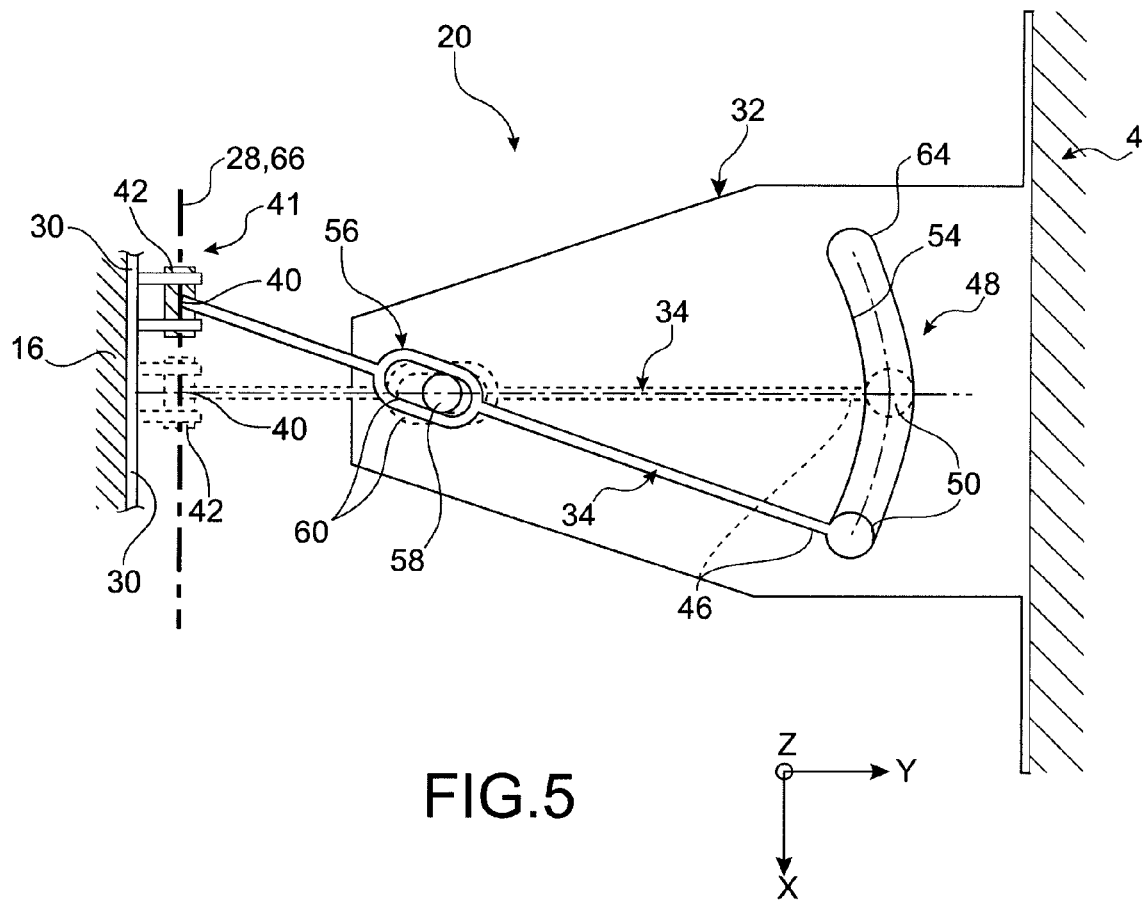
FIG. 5 shows a diagrammatic top view of the hinge device shown in FIGS. 3 and 4, which device is shown in a non-biased mode with dotted lines and in a biased mode with solid lines.

Indeed, in reference to FIG. 5, which diagrammatically shows the device 20 from the top view also corresponding to a view according to the direction of the pivot pin 58, it is possible to see that in the normal non-biased mode shown with dotted lines, the link rod 34 is oriented substantially in direction Y. Thus, as indicated above, it is noted that the real orientation of the link rod 34 in the YZ plane could be different, owing to the initial application of an angular offset centred at the level of the link rod end 46 and enabled by the swivel 52, which offset is made necessary in order to obtain an alignment of the assembly pin 42 according to the hinge axis 28 of the cowling 16.

When there is a relative movement between the engine mounting structure 4 and the cowling 16 according to the hinge axis 28, the link rod 34 has a tendency to pivot about the pivot pin 58 provided for this purpose, and therefore of causing a movement of the guide pin 50 in the ramp 54 along the path 64 that it defines. This path 64 is such that it causes, by the pressure of the pin 50 on the sides of the ramp 54, an additional relative movement of the link rod 34 with respect to the fitting 32, resulting in a movement of the hole 60 with respect to the pivot pin 58. As indicated above, this additional relative movement is preferably akin, from a top view, to a translation in the link rod direction 36, the direction in which the hole 60 is also formed.

With this additional relative movement, as shown with solid lines in FIG. 5, it is then advantageously possible to maintain the positioning of the first link rod end 40 on a movement axis 66 preferably corresponding to the hinge axis 28, the axis 66 on which it is initially centred in non-biased mode. It should thus be understood that the second end connection 48 and intermediate connection 56 are designed so as to make it possible, upon rotation of the link rod 34 about the pivot pin 58 in a biased mode, to maintain the centring of the assembly pin 42 borne by the end 40 on the hinge axis 28.

Figure 6:
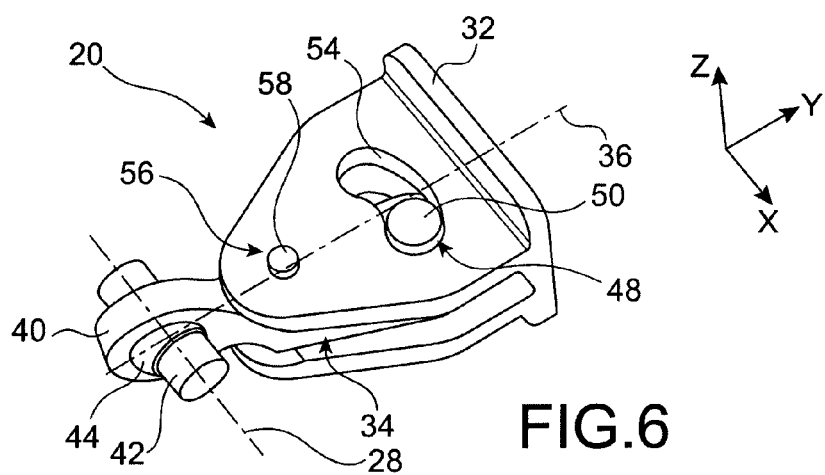
FIG. 6 shows a perspective view of the hinge device of a nacelle cowling in the biased mode.

By way of indication, the hinge device 20 in its biased-mode configuration shown diagrammatically with solid lines in FIG. 5, was shown in detail in perspective in FIG. 6. Naturally, it is specified that the amplitude according to which the link rod 34 can be pivoted about the pin 58 while maintaining its end 40 on the movement axis 66 is in particular limited by the extent of the guide ramp 54, at the bottom of which the pin 50 is capable of being housed as shown in FIG. 6.

Of course, various modifications can be made by a person skilled in the art to the mounting devices 4 and to the engine assembly 1 described above, solely by way of non-limiting examples. In this regard, it is possible in particular to indicate that if the engine assembly 1 had been shown in an adapted configuration in which it was suspended under the wings of the aircraft, this assembly 1 could also be in a different configuration enabling it to be mounted above the same wings, or even on a rear portion of the fuselage of this aircraft.

The invention claimed is:

1. A hinge device of a nacelle cowling of an aircraft engine on a supporting structure, comprising:
   a first fitting which is securely mounted on one of the nacelle cowling or the supporting structure;
   a second fitting which is securely mounted to the other of the nacelle cowling or the supporting structure; and
   a link rod connected to said first and second fittings and extending in a longitudinal link rod direction,
   wherein said link rod includes a first end mounted on the first fitting by a first end connection including an assembly pin which is centered on a hinge axis of the nacelle cowling a second end mounted on said second fitting by a second end connection,
   wherein said link rod is further mounted on said second fitting by an intermediate connection including a pivot pin slidably housed in a hole formed on one of the second fitting or the link rod, and the pivot pin is supported by the other of the second fitting or the link rod, wherein said second end connection includes a guide pin slidably housed in a guide ramp,
   wherein said second end connection and intermediate connection are designed so as to cause, upon rotation of the link rod about the pivot pin, a relative movement of said guide pin in said guide ramp which causes a relative movement of the pivot pin in the hole of said intermediate connection, and
   wherein the pivot pin is slidably housed in the hole formed on one of the second fitting or the link rod in a plane orthogonal to an axis of rotation of the pivot pin.

2. The hinge device according to claim 1, wherein said second end connection and intermediate connection are designed so as to cause the movement of said first link rod end, upon rotation of the link rod about said pivot pin along an axis of movement.

3. The hinge device according to claim 1, wherein said hole is formed in said link rod, and wherein said pivot pin is supported by the second fitting.

4. The hinge device according to claim 3, wherein said hole extends parallel to said longitudinal link rod direction, and wherein said pivot pin is orthogonal to said longitudinal link rod direction and to said hinge axis of the nacelle cowling.

5. The hinge device according to claim 1, wherein said guide ramp is formed in said second fitting, and wherein the guide pin is supported by the link rod.

6. The hinge device according to claim 5, wherein said guide pin is supported by the link rod and a swivel.

7. The hinge device according to claim 5, wherein said guide pin is orthogonal to said longitudinal link rod direction and to said hinge axis of the nacelle cowling.

8. The hinge device according to claim 1, wherein said guide ramp is a double ramp which cooperates with the two ends of the guide pin.

9. The hinge device according to claim 1, wherein said assembly pin is supported by said first end of the link rod and a swivel.

10. A hinge system of a nacelle cowling of an aircraft engine on a supporting structure, comprising at least one hinge device according to claim 1.

11. An engine assembly for an aircraft, including an engine and a nacelle comprising a plurality of nacelle cowlings, wherein at least one of said nacelle cowlings is equipped with a hinge device according to claim 1.

12. The engine assembly according to claim 11, further comprising an engine mounting structure forming said supporting structure for the hinge device.

13. An aircraft comprising at least one engine assembly according to claim 11, assembled on a wing or on a rear portion of the fuselage of said aircraft.

14. The hinge device according to claim 1, wherein the guide ramp is arcuate in shape.

15. The hinge device according to claim 1, wherein an axis of the guide pin and an axis of the pivot pin are both orthogonal to the hinge axis and both extend in a vertical direction.

* * * * *